United States Patent
Watanabe

(10) Patent No.: US 9,698,409 B2
(45) Date of Patent: Jul. 4, 2017

(54) INJECTION METHOD FOR INJECTING ELECTROLYTE AND INJECTION APPARATUS THEREFOR

(75) Inventor: Shinji Watanabe, Osaka (JP)

(73) Assignee: O.M.C. CO., LTD., Osaka (JP)

( * ) Notice: Subject to any disclaimer, the term of this patent is extended or adjusted under 35 U.S.C. 154(b) by 188 days.

(21) Appl. No.: 14/412,365

(22) PCT Filed: Jul. 5, 2012

(86) PCT No.: PCT/JP2012/004377
§ 371 (c)(1),
(2), (4) Date: Feb. 23, 2015

(87) PCT Pub. No.: WO2014/006660
PCT Pub. Date: Jan. 9, 2014

(65) Prior Publication Data
US 2015/0162594 A1  Jun. 11, 2015

(51) Int. Cl.
 *H01M 2/36* (2006.01)
(52) U.S. Cl.
 CPC ........... *H01M 2/361* (2013.01); *H01M 2/362* (2013.01)
(58) Field of Classification Search
 CPC ............................. H01M 2/361; H01M 2/362
 See application file for complete search history.

(56) References Cited

FOREIGN PATENT DOCUMENTS

| JP | 64-057563 A | 3/1989 | | |
|---|---|---|---|---|
| JP | 06-333557 | 12/1994 | | |
| JP | 09-099901 A | 4/1997 | | |
| JP | 09-102443 A | 4/1997 | | |
| JP | 09-283113 A | 10/1997 | | |
| JP | 2001-210310 | * | 8/2001 | ............. H01M 2/36 |
| JP | 2002-274504 A | 9/2002 | | |
| JP | 2004-327167 A | 11/2004 | | |

* cited by examiner

*Primary Examiner* — Patrick Ryan
*Assistant Examiner* — Ben Lewis
(74) *Attorney, Agent, or Firm* — Lucas & Mercanti, LLP

(57) ABSTRACT

[Object] It is an object to provide an injection method for injecting an electrolyte and an electrolyte injection apparatus which allow the electrolyte to be injected and filled into an electrode assembly within an outer can with favorable permeation, thereby easily manufacturing an electrolyte secondary battery having favorable cycle characteristics at good yield.
[Solution] A solution injection nozzle 10 is inserted into a solution injection hole 101 of an outer can 100 in which an electrode assembly 110 is stored, and the solution injection hole 101 is hermetically sealed by a pressure reducing pad 11 provided so as to surround a periphery of the solution injection nozzle 10. An inside of the outer can 100 is made into a negative pressure through the pressure reducing pad 11, and an electrolyte L is supplied from the solution injection nozzle 10 into the outer can 100. The outer can 100 is rotated with the solution injection nozzle 10 as a rotation center.

4 Claims, 7 Drawing Sheets

(A)

(B)

(C)

(D)

INJECTION METHOD FOR INJECTING ELECTROLYTE AND INJECTION APPARATUS THEREFOR

CROSS REFERENCE TO RELATED APPLICATION

This Application is a 371 of PCT/JP2012/004377 filed on Jul. 5, 2012 application which is incorporated herein by reference.

TECHNICAL FIELD

The present invention relates to an injection method for injecting an electrolyte for a secondary battery, and an apparatus therefor.

BACKGROUND ART

At present, improvements to secondary batteries such as lithium-ion secondary battery are being actively made, since it is possible to achieve a high voltage and a high energy density with a secondary battery. Main components of a secondary battery are an assembly of a power generating element body composed of a pair of electrodes, namely, a positive electrode and a negative electrode, and a separator which separates both electrodes to prevent a short circuit therebetween, an electrolyte filled in the power generating element body, and an outer can which stores these components therein.

A lithium secondary battery that has been put to practical use is manufactured through the following procedure. Both positive and negative electrodes and a separator are inserted into an outer can body in a state of being wound in an overlap manner or being laminated on each other, and an opening of the outer can body is closed with a cap. Thereafter, an electrolyte is injected through an injection hole provided in the cap, and then the injection hole is sealed.

When the electrolyte is filled into the outer can, the electrolyte has to infiltrate into the entirety of the electrode assembly obtained by assembling the positive and negative electrodes and the separator. However, each of the gaps between the positive and negative electrodes and the separator in the electrode assembly which is a wound body or laminated body of the positive and negative electrodes and the separator which are in the form of sheet is very narrow, and it takes time until air having entered the gaps is replaced with the electrolyte that has newly infiltrated into the gaps and the electrolyte completely permeates and infiltrates into the gaps. Thus, it is necessary to inject the electrolyte, to store the outer can that remains open in a wide clean room that is adjusted into an optimum environment by its humidity and temperature being managed, for causing the electrolyte to gradually infiltrate into the gaps in the electrode assembly, and to cause the outer can to stand still until the replacement is completed. This method has a problem that it takes an excessive amount of time to cause the electrolyte to permeate into the electrode assembly and the electrolyte cannot be efficiently filled therein.

Thus, Patent Literature 1 has been proposed as improvement of the electrolyte filling method. A method described in Patent Literature 1 is a method in which the pressure in an outer can in which an electrode assembly is stored is reduced and an electrolyte is supplied under the reduced pressure, and the electrolyte is sucked by the pressure-reduced outer can as in a dropper, and injected and filled therein. In this method, the electrolyte is sucked into the outer can that is kept at a negative pressure, and thus the injection filling time is significantly shortened as compared to the conventional replacement method. However, micro air bubbles remaining in the gaps in the electrode assembly are increased in volume while the pressure is reduced, and a state is kept in which the air bubbles are stuck in the gaps. Thus, the electrolyte does not reach this portion, and a state is provided in which small bores are present. Accordingly, this method still is problematic for a demand for dense filling of the electrolyte.

Furthermore, as a solution to the problem of this method, a method described in Patent Literature 2 has been proposed. In this method, after the inside of an outer can is made into a negative pressure by suction, the electrolyte is injected. In a state of the electrolyte being injected, pressure is applied to decrease the volumes of micro air bubbles remaining stuck in the gaps, such that it is made easy for the air bubbles to float up from the gaps, whereby the degree of filling is increased. The pressure reduction and the pressure application are repeated. By this method, the injection rate is further increased. However, the buoyancy of the micro air bubbles is merely used, and there are micro air bubbles that do not float up due to the surface tension thereof or the like. Thus, the demand for dense filling of the electrolyte cannot be fully met. Other than the above, a filling method with only pressure application (Patent Literature 3) and a method using a centrifugal force (Patent Literature 4) have also been proposed.

CITATION LIST

Patent Literature

[PTL 1] Japanese Laid-Open Patent Publication No. 09-102443
[PTL 2] Japanese Laid-Open Patent Publication No. 09-099901
[PTL 3] Japanese Laid-Open Patent Publication No. 2002-274504
[PTL 4] Japanese Laid-Open Patent Publication No. 2004-327167

DISCLOSURE OF THE INVENTION

Problems to be Solved by the Invention

The above-described pressure reducing method or the above-described method using pressure reduction and pressure application in combination is unsatisfactory in terms of mass production since it is problematic in terms of stability or reliability as described above. In addition, for an electrolyte battery of such a type, densification of the electrode assembly (increasing the degree of filling of an active material or tightening winding/lamination) is promoted with compactification of the components or an increase in the capacity, and thus there is a tendency that it is hard for the electrolyte to permeate. Poor permeation of the electrolyte increases the time taken to inject and fill the electrolyte, resulting in deterioration of the productivity. Moreover, with insufficiency of the amount of the injected and filled electrolyte, a problem, such as causing a decrease in cycle characteristics of an electrolyte type battery, is concerned.

In the method using a centrifugal force, after solution injection, a solution injection nozzle is detached, and then dense filling of the electrolyte is conducted by rotating the outer can. Thus, it is necessary to repeat the solution injection process and the dense filling process, and hence the manufacturing process is complicated and there is a problem that it takes time for the filling. In addition, the outer can is merely rotated in a state where the electrolyte has been dropped, and thus the electrolyte does not positively infiltrate into the micro gaps, and there is also a problem that air bubbles stuck in the micro gaps are unlikely to be removed and insufficiency of the amount of the injected and filled electrolyte still remains.

The present invention has been made by coping with the above-described circumstances, and an object of the present invention is to provide an injection method for injecting an electrolyte and an electrolyte injection apparatus which allow the electrolyte to be injected and filled into an electrode assembly within an outer can with favorable permeation, thereby easily manufacturing an electrolyte secondary battery having favorable cycle characteristics at good yield.

Solution to the Problems

An invention according to an injection method for injecting an electrolyte L of item 1 is characterized in "inserting a solution injection nozzle 10 into a solution injection hole 101 of an outer can 100 in which an electrode assembly 110 is stored, and hermetically sealing the solution injection hole 101 by a pressure reducing pad 11 provided so as to surround a periphery of the solution injection nozzle 10; making an inside of the outer can 100 into a negative pressure through the pressure reducing pad 11, and supplying the electrolyte L from the solution injection nozzle 10 into the outer can 100; and rotating the outer can 100 with the solution injection nozzle 10 as a rotation center".

Here, the outer can 100 is rotated simultaneously with or after start of suction of air within the outer can 100, and solution injection is conducted simultaneously with the suction or after start of the suction. The electrolyte L that has been injected and entered a gap in the electrode assembly 110 within the outer can 100 by the inside of the outer can 100 being made into the negative pressure by the suction is pushed to flow toward a lateral side of the outer can 100 by a centrifugal force generated by the rotation, thereby forcibly pushing out micro air bubbles having entered the same gap, toward the lateral side, and the electrolyte L spreads to push out the pushed-out micro air bubbles to above the electrode assembly 110. Then, the pushed-out micro air bubbles are continuously sucked through the pressure reducing pad 11. In addition, since gas occluded in the electrolyte L is also simultaneously and continuously sucked through the pressure reducing pad 11, the electrolyte L smoothly infiltrates into micro gaps between positive and negative electrodes and a separator, dense filling is quickly conducted in the solution injection, and the solution injection operation ends substantially at the same time with completion of the solution injection. It should be noted that the outer can 100 rotates with the solution injection nozzle 10 as a rotation center, and thus the solution injection hole 101 does not impede the solution injection operation even when the solution injection hole 101 is located in any portion of the outer can 100.

A injection method according to item 2 is characterized in that "the solution injection nozzle 10 is inserted into the solution injection hole 101 and solution injection is conducted after reduction of a pressure in the outer can 100 through the pressure reducing pad 11" in the injection method according to item 1. An injection method according to item 3 is characterized in that "pressure reduction is continuously conducted during solution injection from the solution injection nozzle 10" in injection method according to item 1 or 2. In the injection method according to item 2, since the solution injection nozzle 10 is not inserted into the solution injection hole 101 at the time of pressure reduction, the solution injection hole 101 is widely open at the time of pressure reduction, and hence it is possible to increase a pressure reducing rate. When the pressure reduction is continuously conducted also during the solution injection as in item 3, it is possible to continuously suck and remove air remaining in the outer can 100 and gas occluded in the electrolyte L, and thus it is possible to more quickly and densely fill the electrolyte L.

Item 4 is an apparatus for executing the electrolyte injection methods according to items 1 to 3, including:

a rotating platform 1 configured to retain an outer can 100 in which an electrode assembly 110 is stored and to rotate with a solution injection hole 101 of the outer can 100 as a rotation center;

a solution injection device 5 including a solution injection nozzle 10 which is provided so as to coincide with the rotation center of the rotating platform 1 and is configured to supply an electrolyte L into the outer can 100 when being inserted into the solution injection hole 101 of the outer can 100, and a pressure reducing pad 11 which is provided so as to surround a periphery of the solution injection nozzle 10 and is configured to adhere to a portion surrounding the solution injection hole 101 by suction and to make an inside of the outer can 100 into a pressure-reduced state at a time of solution injection;

a lifting/lowering device 20 configured to cause the rotating platform 1 and the solution injection device 5 to be relatively close to each other or separated from each other and to press the pressure reducing pad 11 against the portion surrounding the solution injection hole 101 to hermetically seal the solution injection hole 101 when the rotating platform 1 and the solution injection device 5 are caused to be close to each other; and a rotary drive device 30 configured to rotate the outer can 100.

Item 5 is characterized in the apparatus of item 4 "further including a nozzle insertion/detachment mechanism 40 configured to bring the pressure reducing pad 11 into contact with the portion surrounding the solution injection hole 101 of the outer can 100, to retain the solution injection nozzle 10 outside the solution injection hole 101 during a period from start of reduction of a pressure in the outer can 100 to a time of the pressure being reduced to a predetermined pressure, and to insert the solution injection nozzle 10 into the solution injection hole 101 after reaching the predetermined pressure".

Advantageous Effects of the Invention

According to the present invention, due to the synergistic effect of the reduction of the pressure in the outer can 100 by suction and the centrifugal force generated by the rotation with the solution injection nozzle 10 as a rotation center, the electrolyte L injected into the outer can 100 rapidly infiltrates into a very narrow gap in the electrode assembly 110, and it is possible to complete the solution injection in a short time. In addition, the rotation with the solution injection nozzle 10 as a rotation center is possible even when the solution injection hole 101 is located in any portion of the outer can 100, and the solution injection nozzle 10 can be used for all types of outer cans 100.

DESCRIPTION OF EMBODIMENTS

Figure 1:
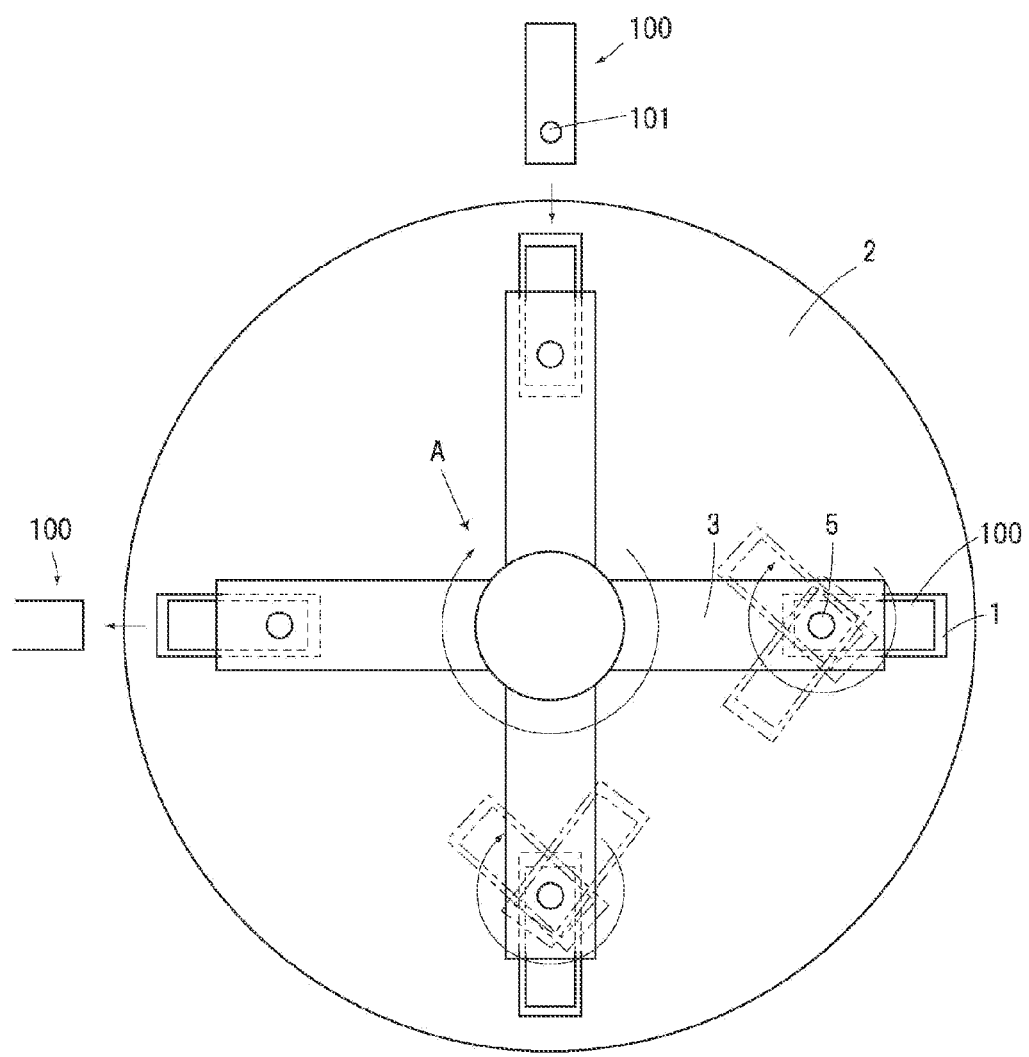
FIG. 1 is a schematic plan view of an apparatus according to the present invention.
Figure 2:
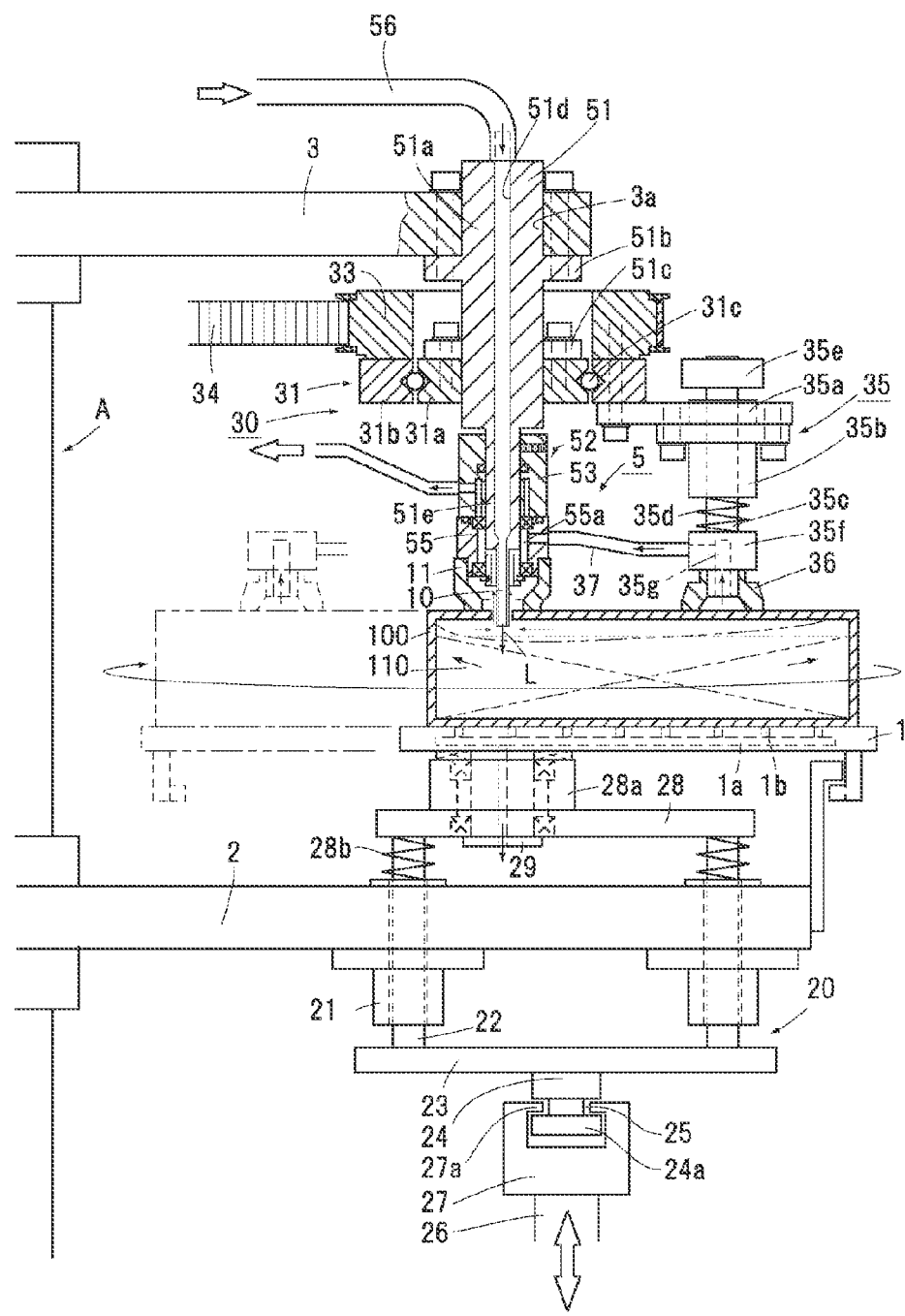
FIG. 2 is a partial cross-sectional view of a principal part of a first embodiment of the apparatus according to the present invention.
Figure 3:
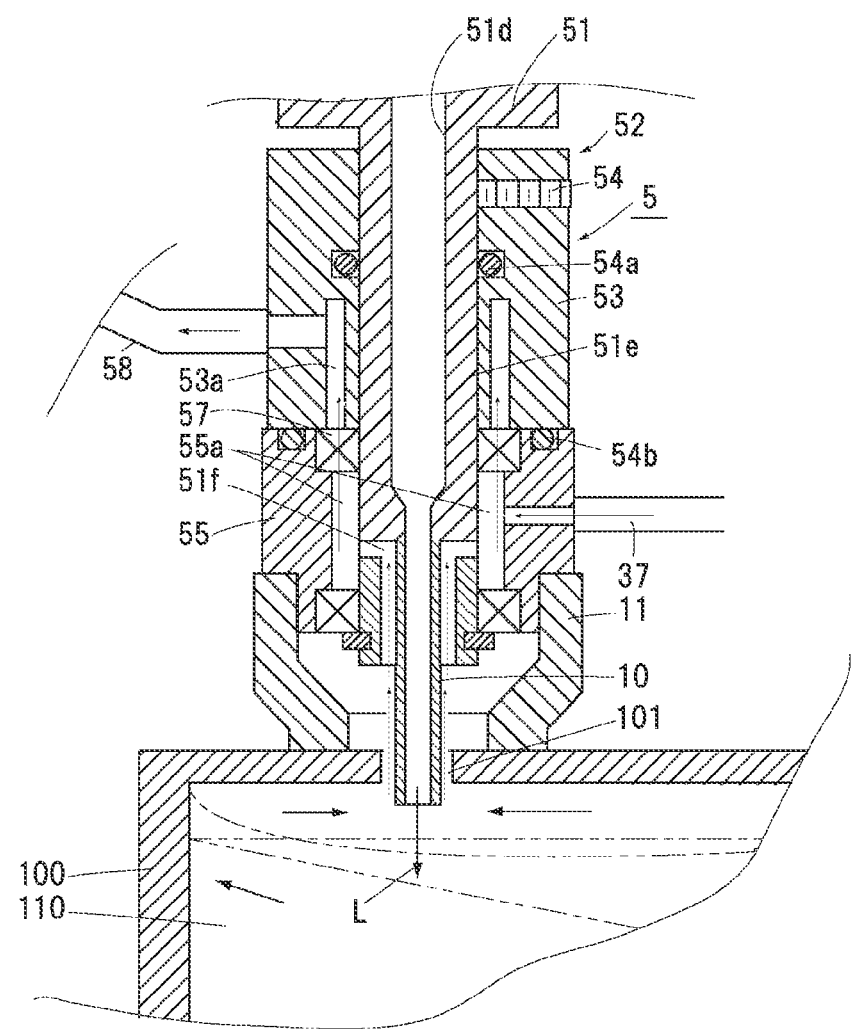
FIG. 3 is an enlarged cross-sectional view of a solution injection device in FIG. 1.
Figure 4:
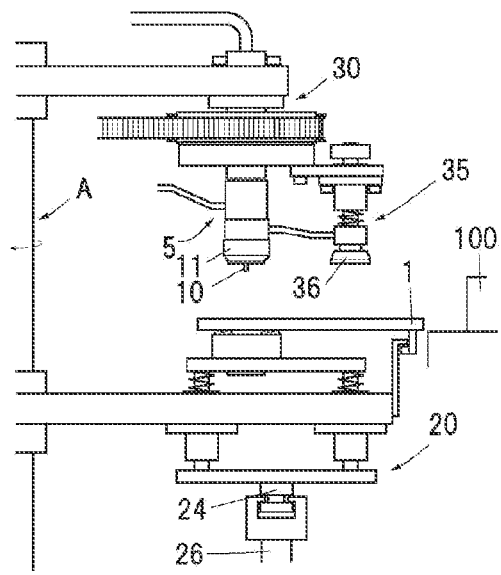
FIG. 4(A) is a partial front view before insertion of an outer can, FIG. 4 (B) is a partial front view immediately after the insertion of the outer can, FIG. 4 (C) is a partial front view when a solution injection nozzle is inserted into the outer can, and FIG. 4 (D) is a partial front view when an electrolyte is being injected from the solution injection nozzle.
Figure 4:
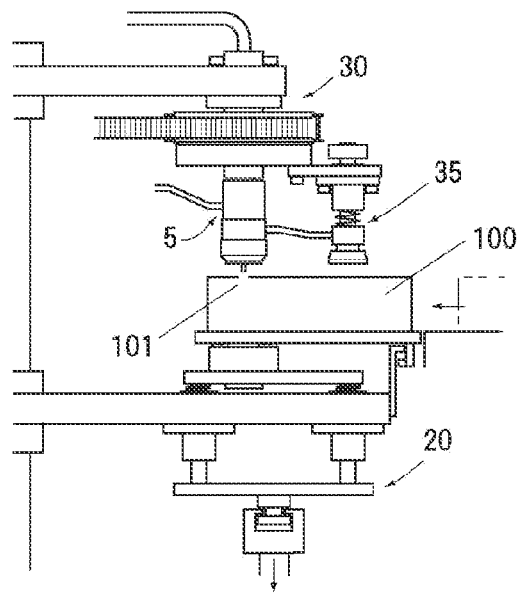
Figure 4:
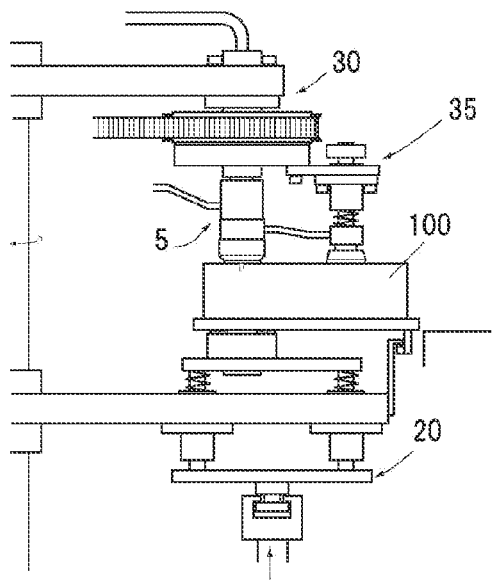
Figure 4:
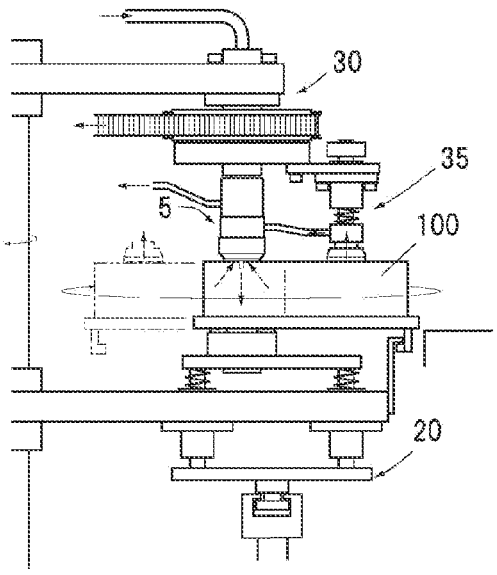

Hereinafter, a first embodiment of the present invention will be described with reference to FIGS. 1 to 4. An outer can 100 which is a workpiece applied to the present invention is a can which has an electrode assembly 110 stored therein and in which a solution injection hole 101 is provided in an upper surface thereof. The diameter of the solution injection hole 101 is generally determined, but the position thereof is varied depending on the type of a product. In addition, the shape and the size of the outer can 100 are varied depending on the type. The outer can 100 also serves as a negative electrode terminal, and is, for example, a can which is made of stainless copper and has a bottomed circular tube or square tube shape. The stored electrode assembly 110 is composed of positive and negative electrodes and a separator which separates these electrodes. These components have a sheet shape, and the electrode assembly 110 is a laminated body of the sheet-shaped positive electrode, the sheet-shaped separator, and the sheet-shaped negative electrode or a wound body obtained by spirally winding a laminated body of the sheet-shaped positive electrode, the sheet-shaped separator, and the sheet-shaped negative electrode. Very narrow gaps are present between these components, and an electrolyte L is to be filled within the gaps.

This apparatus includes an apparatus main body A which intermittently rotates, a disk base 2 provided on the apparatus main body A, a plurality of arms 3 (four arms in the present embodiment) extending above the disk base 2 and radially from the apparatus main body A, solution injection devices 5 mounted on the arms 3, rotary drive devices 30 provided at the solution injection device 5, a lifting/lowering device 20 provided at the disk base 2 for each stage in corresponding relation to each arm 3, rotating platforms 1 provided at the lifting/lowering devices 20, and a controller and a piping system which are not shown. In the apparatus main body A, lifting/lowering device driving portions 26 are provided below the disk base 2 and at a first stage for introducing the outer can 100 and a final stage for ejecting the outer can 100.

The disk base 2 is fixedly provided on the apparatus main body A and is configured to intermittently rotate by a predetermined angle corresponding to the number of stages by an intermittent rotation drive mechanism such as a barrel cam mechanism. In the first embodiment, the disk base 2 is configured to rotate at intervals of 90° at four stages, but, off course, the disk base 2 is not limited thereto. A plurality of the arms 3 whose number corresponds to the number of stages extend above the disk base 2 and radially from the apparatus main body A.

The solution injection devices 5 are mounted on the arms 3 and each are configured as follows. An insertion mounting portion 51a of a nozzle main body 51 is inserted into a mounting hole 3a provided in an end of the arm 3, and a flange 51b of the nozzle main body 51 is bolted to the arm 3. The nozzle main body 51 has an elongate circular tube shape and is provided with the above flange 51b at its upper portion. A mounting ring 51c for mounting an inner ring 31a of the rotary drive device 30 described later is provided directly below the flange 51b, a middle portion of the nozzle main body 51 is formed so as to be thin, and a pressure reducing member 52 is mounted on this portion. The portion that is formed so as to be thin is referred to as a small-diameter portion 51e. An end portion of the nozzle main body 51 is cut so as to be further thin to be formed as a solution injection nozzle 10, and the nozzle main body 51 has a nozzle insertion hole 51d extending through the center thereof. One or a plurality of first suction holes 51f are formed in a lower end surface and a lateral surface of the small-diameter portion 51ie. It should be noted that a solution injection pipe 56 is connected to an upper end portion of the solution injection nozzle 10.

The pressure reducing member 52 includes a fixed portion 53, a rotating portion 55, and a pressure reducing pad 11. The fixed portion 53 has a through hole extending through the center thereof, and the aforementioned small-diameter portion 51e is inserted therethrough and fixed by a locking screw 54. A third suction hole 53a is formed in a lower surface and a lateral surface of the fixed portion 53, and a packing 54a for blocking a gap between the small-diameter portion 51e and the through hole is provided on an inner peripheral surface of the through hole. A pressure reducing pipe 58 is connected to a suction exit of the third suction hole 53a.

The rotating portion 55 is a circular tube-shaped member mounted directly below the fixed portion 53, and is rotatably mounted on a pair of bearings 57 mounted on the small-diameter portion 51e. A packing 54b for blocking a gap between an upper surface of the rotating portion 55 and the lower surface of the fixed portion 53 is mounted on the upper surface of the rotating portion 55. Between the upper and lower bearings 57, there is a gap between an outer peripheral surface of the small-diameter portion 51e and an inner peripheral surface of the rotating portion 55, and this portion serves as a second suction hole 55a. The first suction holes 51f of the small-diameter portion 51e communicate with the second suction hole 55a. As a result, the first suction holes 51f, the second suction hole 55a, gaps between inner races and outer races of the bearings 57, and the third suction hole 53a form a suction passage which leads to the pressure reducing pipe 58. It should be noted that the suction passage is not limited to have such a shape, and although not shown, the suction passage may extend through the small-diameter portion 51e and communicate directly with the third suction hole 53a of the fixed portion 53 and further may extend through the small-diameter portion 51e and be open in a lateral surface of the nozzle main body 51 to lead to the pressure reducing pipe 58.

The pressure reducing pad 11 is a circular column-shaped member which is hermetically fitted to a lower end portion of the rotating portion 55, and is formed from an elastomer such as soft rubber or a resin. A suction adhesion portion of the pressure reducing pad 11 has a tapered circular tube shape, and an inner diameter thereof is larger than that of the solution injection hole 101 such that the suction adhesion portion is sized so as to be able to assuredly cover the solution injection hole 101 at the time of adhesion by suction. The suction adhesion portion is not limited to have the shape shown in the drawing and may be a portion with a suction cup shape. Here, reduction of the pressure in the outer can 100 is generally conducted through connection with a vacuum evacuation device, and the degree of evacuation (the degree of vacuum) is preferably equal to or lower than about 10 torr, in order to efficiently conduct injection and filling of the electrolyte L in a suction manner.

Each rotary drive device 30 includes a driven pulley 33, a rotation mechanism portion 31, and a suction adhesion rotator 35. The rotation mechanism portion 31 includes the inner ring 31a which is bolted to the mounting ring 51c provided to the nozzle main body 51; and an outer ring 31b which is rotatably mounted on the inner ring 31a via a plurality of steel balls 31c arranged at equal intervals. The driven pulley 33 is mounted on the outer ring 31b. A rotary driving force is applied to the driven pulley 33 via a timing belt 34 by a drive pulley which is not shown, such that the outer ring 31b rotates at a predetermined speed relative to the fixed inner ring 31a.

The suction adhesion rotator 35 includes a rotator mounting portion 35a which is mounted on the outer ring 31b; a guide member 35b which includes a flange mounted on a lower surface of the rotator mounting portion 35a and has a through hole extending through the center thereof, a slide shaft 35c which is slidably inserted through the through hole; a stopper 35e which is mounted on an upper end of the slide shaft 35c; a suction adhesion block 35f which is mounted on a lower end of the slide shaft 35c; a spring 35d which is provided between the suction adhesion block 35f and the guide member 35b and presses and urges the suction adhesion block 35f downward; and a suction adhesion pad 36 which is mounted on a lower surface of the suction adhesion block 35f. The suction adhesion block 35f has a suction adhesion hole 35g communicating with the suction adhesion pad 36, and the suction adhesion hole 35g is connected to the second suction hole 55a of the rotating portion 55 via a suction adhesion pipe 37.

Each lifting/lowering device 20 is mounted on the disk base 2 in corresponding relation to each arm 3 as follows. A pair of flange-equipped guide blocks 21 constituting a part of the lifting/lowering device 20 are bolted to a lower surface of the disk base 2, and lifting/lowering shafts 22 are inserted therethrough so as to be able to freely lift/lower.

An upper end bar 28 extends on and between upper ends of the lifting/lowering shafts 22. A rotating shaft 29 is mounted via a bearing on a support portion 28a provided on an upper surface of the upper end bar 28, and the rotating platform 1 is fixed to an upper end of the rotating shaft 29. The rotation center of the rotating shaft 29 coincides with the centerline of the solution injection nozzle 10. A compression coil spring 28b is wound around each lifting/lowering shaft 22 between the upper end bar 28 and the disk base 2 and constantly presses and urges the rotating platform 1 upward.

The rotating platform 1 is used to place and fix the outer can 100 thereon, and as its fixing means, a clamp system which is not shown, a suction adhesion system in which a void portion 1a is provided in the rotating platform 1 and suction adhesion holes 1b communicating with the void 1a are open in an upper surface of the rotating platform 1 such that a bottom of the outer can 100 is caused to adhere thereto by suction, or another appropriate system is used. Here, the suction adhesion system is used. Placing and fixing the outer can 100 on the rotating platform 1 is conducted such that the position of the solution injection hole 101 of the outer can 100 coincides with the position of the solution injection nozzle 10.

A lower end bar 23 extends on and between lower ends of the lifting/lowering shafts 22. A lifting/lowering drive projection 24 is mounted on a lower surface of the lower end bar 23, and a lifting/lowering drive groove 25 is provided on a lateral surface of the lifting/lowering drive projection 24 and along the entire circumference thereof.

The lifting/lowering device driving portions 26 such as cylinders which are not shown are provided below the disk base 2 and at the first stage to which an empty outer can 100 is supplied and the final stage from which an outer can 100 in which the electrolyte L has been filled is ejected, among the stages which are positions at which intermittent rotation of the disk base 2 stops. A lifting/lowering block 27 is mounted on a rod of each lifting/lowering device driving portion 26, and a pair of lifting/lowering drive hooks 27a of the lifting/lowering block 27 which have an inverted L shape and whose ends face inside are engageable with and disengageable from the aforementioned lifting/lowering drive groove 25 from left and right. In other words, when the lifting/lowering drive projection 24 moves to the inside of the lifting/lowering drive hooks 27a of the lifting/lowering block 27 as a result of intermittent rotation, a large-diameter portion 24a of the lifting/lowering drive projection 24 at the lower side of the lifting/lowering drive groove 25 is fitted therein. Then, the large-diameter portion 24a is detached therefrom with intermittent rotation of the disk base 2.

Thus, as shown in FIGS. 1 and 4(A), the lifting/lowering drive hooks 27a of the lifting/lowering device driving portion 26 are engaged with the lifting/lowering drive projection 24 of the rotating platform 1 on the disk base 2 that has stopped at the first stage as a result of intermittent rotation, and the lifting/lowering device driving portion 26 operates to pull the lifting/lowering drive projection 24 downward against elastic forces of the compression coil springs 28b to pull the rotating platform 1 downward to a bottom dead point (lowest point). Then, as shown in FIG. 4(B), an empty outer can 100 is transferred onto the rotating platform 1 by a transferring means such as a robot hand which is not shown, and is positioned such that the position of the solution injection hole 101 of the outer can 100 coincides with the position of the solution injection nozzle 10 as described above. Then, the empty outer can 100 is locked or fixed by suction adhesion on the rotating platform 1. Subsequently, as shown in FIG. 4(C), the lifting/lowering device driving portion 26 operates in a reverse manner to press the lifting/lowering drive projection 24 upward to press the rotating platform 1 upward to a top dead point (highest point). Thus, the solution injection nozzle 10 that has waited directly above the solution injection hole 101 is inserted into the solution injection hole 101. At the same time, the pressure reducing pad 11 is pressed against a portion surrounding the solution injection hole 101, and the suction adhesion pad 36 is also pressed against an upper surface of the outer can 100 by the elastic forces of the compression coil springs 28b.

When a pressure reducing device which is not shown is activated in this state, air within the outer can 100 is sucked through the pressure reducing pad 11 and the pressure in the outer can 100 is gradually reduced as shown in FIG. 4(D). At the same time, air within the suction adhesion pad 36 is also sucked and the suction adhesion pad 36 is caused to adhere to the upper surface of the outer can 100 by suction. Simultaneously with or after this pressure reduction, a solution injection device which is not shown is activated to supply the electrolyte L into the outer can 100. In addition, when the suction adhesion of the suction adhesion pad 36 is completed, a rotation device such as a motor which is not shown is activated to activate the timing belt 34.

By the activation of the timing belt 34, the suction adhesion pad 36 revolves around the solution injection nozzle 10 at a predetermined speed to rotate the outer can 100 together with the rotating platform 1. The injected electrolyte L rapidly enters the micro gaps in the electrode assembly 110 within the outer can 100 whose pressure has been reduced, but air bubbles remain within the micro gaps. In addition, gas is occluded in the electrolyte L, and this gas enters the outer can 100 together with the electrolyte L and impedes dense filling of the electrolyte L. Here, since the outer can 100 rotates as described above, the remaining air bubbles and the gas that has entered the outer can 100 together with the electrolyte L are pushed out toward an inner surface of the outer can 100 by the electrolyte L that has rapidly entered the micro gaps in the electrode assembly 110. Subsequently, the gas and the air bubbles are pushed out to above the electrode assembly 110 along the inner surface by being pushed by the electrolyte L that has spread in the gaps. There is a slight gap between the electrode assembly 110 and a ceiling surface of the outer can 100, and the pushed-out air and gas are sucked from this gap through the pressure reducing pad 11. As a result, quick dense filling of the electrolyte L is achieved.

When the transferring of the outer can 100 onto the rotating platform 1 ends, and the lifting/lowering device driving portion 26 lifts and the insertion of the solution injection nozzle 10 into the outer can 100 and the pressing of the pressure reducing pad 11 and the suction adhesion pad 36 are completed as described above, intermittent rotation of the disk base 2 is enabled, thereby shifting to the next stage. As a result of this movement, the lifting/lowering drive projection 24 is detached from the lifting/lowering drive hooks 27a of the lifting/lowering block 27. The insertion of the solution injection nozzle 10 and the pressing of the outer can 100 against the pressure reducing pad 11 and the suction adhesion pad 36 are kept by the elastic forces of the compression coil springs 28b.

Solution injection is conducted simultaneously with or before or after start of the reduction of the pressure in the outer can 100 by the pressure reducing pad 11 (normally, after the start of the pressure reduction). When the pressure reduction is continuously conducted even during the solution injection, it is possible to continuously suck and remove air remaining in the outer can 100 and the gas occluded in the electrolyte L, and thus it is possible to more quickly and densely fill the electrolyte L. In addition, the outer can 100 is rotated after completion of the suction adhesion of the suction adhesion pad 36. Normally, the outer can 100 is rotated simultaneously with or after the solution injection, but, off course, the outer can 100 may be rotated before the solution injection.

The solution injection operation is continued until the rotating platform 1 reaches the final stage from the first stage. Since the lifting/lowering device driving portions 26 are provided only at the first stage and the final stage, when the outer can 100 in which the electrolyte L has been filled reaches the final stage, the lifting/lowering drive hooks 27a located at the top dead point are engaged with the lifting/lowering drive projection 24, then the rotating platform 1 is pulled downward to the bottom dead point by the lifting/lowering drive hooks 27a through the reverse operation of the lifting/lowering device driving portion 26, and the outer can 100 in which the electrolyte L, has been filled is sent out from the rotating platform 1 as shown in FIG. 1. Meanwhile, similarly to the above description, an empty outer can 100 is transferred onto the empty rotating platform 1 that has reached the first stage.

Figure 5:
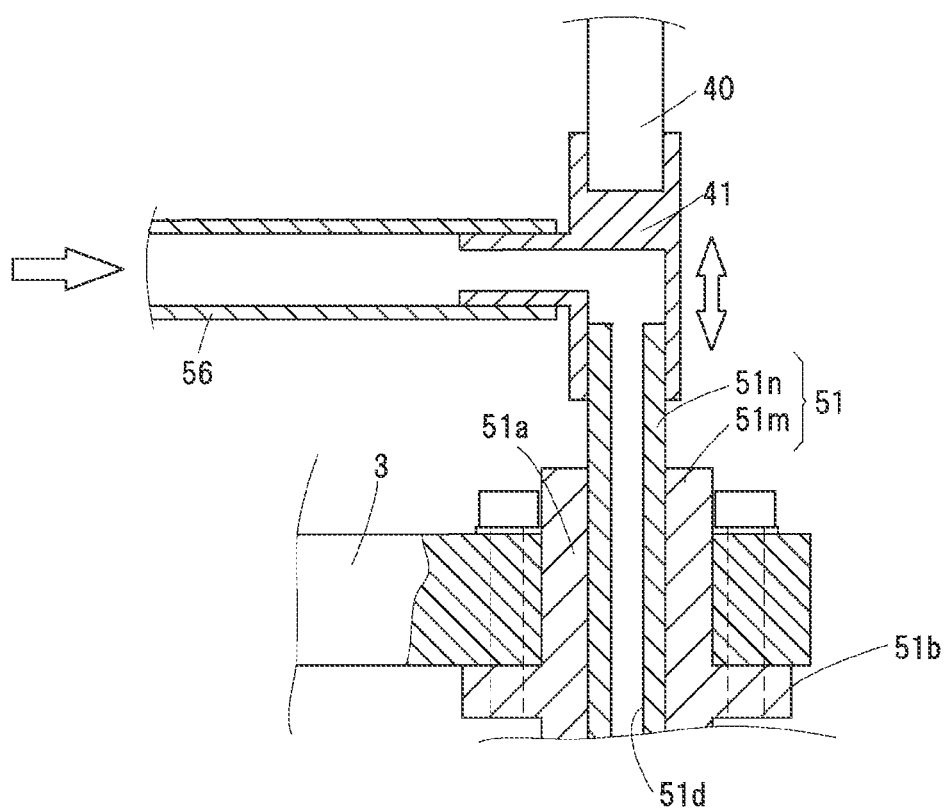
FIG. 5 is an enlarged cross-sectional view of a solution injection nozzle insertion/detachment mechanism of a second embodiment according to the present invention.
Figure 6:
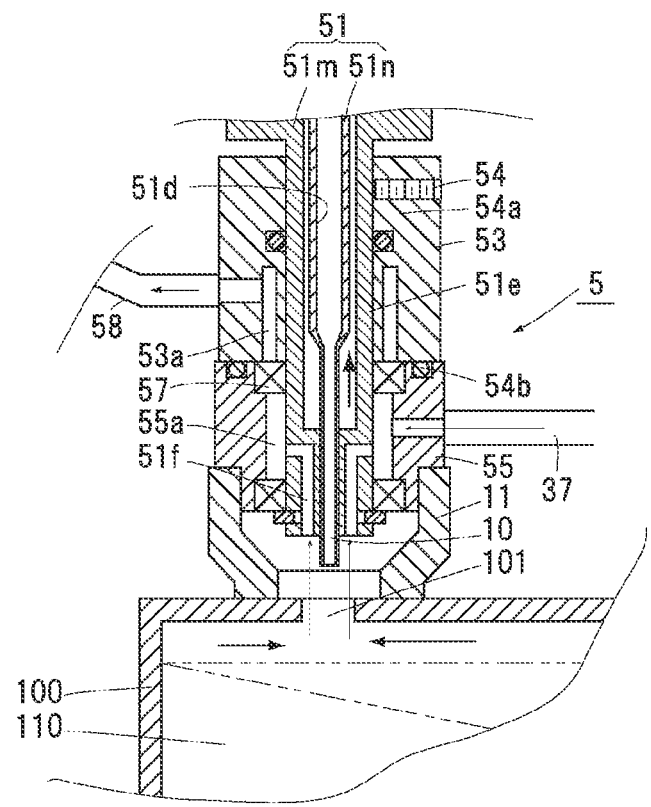
FIG. 6 is an enlarged cross-sectional view before insertion of a solution injection nozzle of the second embodiment according to the present invention.
Figure 7:
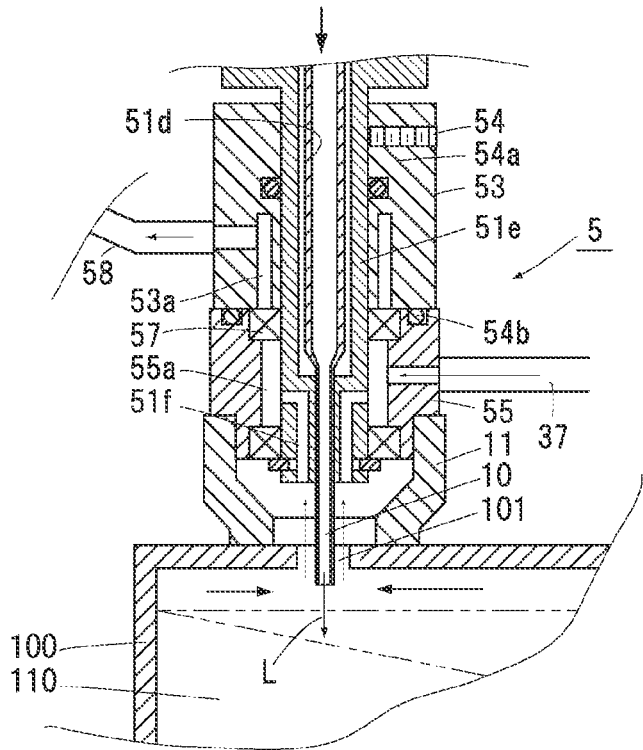
FIG. 7 is an enlarged cross-sectional view after the insertion of the solution injection nozzle in FIG. 6.

FIGS. 5 to 7 show a second embodiment of the nozzle main body 51. The nozzle main body 51 is a double pipe composed of a sheath pipe 51m and a nozzle pipe 51n, and the nozzle pipe 51n is lifted/lowered in a slide hole of the sheath pipe 51m by a rod of a nozzle insertion/detachment mechanism 40 such as a cylinder which is not shown, via a connection communication pipe 41. An end portion of the nozzle pipe 51n is formed as a thin solution injection nozzle 10 and is extended/retracted from/into a lower end of the slide hole of the sheath pipe 51m. In addition, the sheath pipe 51m is bolted to the arm 3, and the solution injection pipe 56 is connected to the connection communication pipe 41.

The lifting/lowering of the nozzle pipe 51n is conducted at timing in accordance with the pressure reduction operation. In other words, in reducing the pressure in an initial outer can 100 before solution injection, when the solution injection hole 101 of the outer can 100 is blocked by the pressure reducing pad 11 as shown in FIG. 6, the nozzle pipe 51n is stored within the pressure reducing pad 11, and the solution injection nozzle 10 is in a state of not being inserted into the solution injection hole 101. As a result, suction within the outer can 100 through the pressure reducing pad 11 is conducted over the entire area of the solution injection hole 101, and the suction area is larger than that in a state where the solution injection nozzle 10 is inserted into the solution injection hole 101 as in the first embodiment, by the solution injection nozzle 10. Thus, the suction rate is increased. When the degree of pressure reduction in the outer can 100 reaches a predetermined value (or when a predetermined time period has elapsed from the start of the pressure reduction), the nozzle pipe 10b is projected such that the solution injection nozzle 10 is inserted into the solution injection hole 101, and then solution injection is started, as shown in FIG. 7. The pressure reduction is preferably continuously conducted also during the solution injection. When the solution injection ends, the nozzle pipe 51n is retracted toward the sheath pipe 51m side again.

Figure 8:
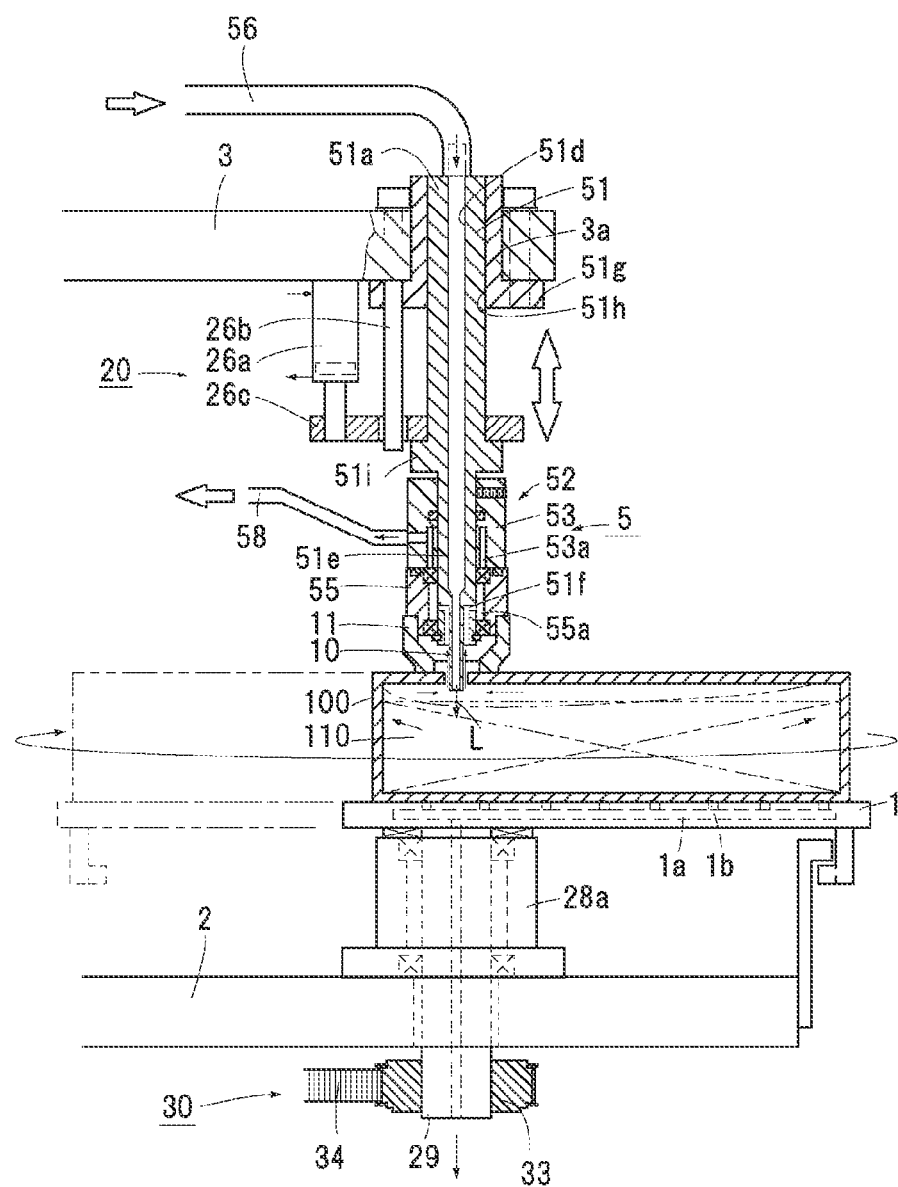
FIG. 8 is a partial cross-sectional view of a principal part of a third embodiment of the apparatus according to the present invention.

FIG. 8 shows a third embodiment of the present invention. In this case, the rotating shaft 29 is rotated instead of the suction adhesion pad 36, and further the solution injection device 5 is lifted/lowered. In this case, the rotating shaft 29 is extended to below the disk base 2, and the driven pulley 33 is mounted on the extended portion thereof. Thus, when the timing belt 34 is activated, the rotating platform 1 mounted on the rotating shaft 29 also rotates at a predetermined speed.

Meanwhile, since the solution injection device 5 lifts/lowers, a main body portion of a nozzle guide 51g for guiding the nozzle main body 51 which lifts/lowers is mounted in the mounting hole 3a of the arm 3, and a flange portion of the nozzle guide 51g is bolted to a lower surface of the arm 3. The insertion mounting portion 51a which is an upper end portion of the nozzle main body 51 is slidable in a guide hole 51h provided in the nozzle guide 51g.

The lifting/lowering device 20 on the solution injection device 5 includes, for example, a lifting/lowering cylinder 26a which is mounted on the arm 3, a guide plate 26c which is mounted on an outer flange 51i provided at a middle portion of the nozzle main body 51, and a lifting/lowering guide 26b which is provided so as to be hanged from the arm 3 and is inserted into a guide hole provided in the guide plate 26c. A rod of the above lifting/lowering cylinder 26a is mounted on the guide plate 26c.

Also in the third embodiment, injection and filling of the electrolyte L is conducted through motion similar to that in the first embodiment, but its mechanism is different therebetween and thus the difference will be mainly described below. Similarly to the first embodiment, an empty outer can 100 is transferred onto the rotating platform 1 on the disk base 2 that has stopped at the first stage as a result of intermittent rotation, for example, by a robot arm. At that time, the lifting/lowering cylinder 26a keeps a state where the nozzle main body 51 is pulled upward. When the outer can 100 is fixed at a predetermined position on the rotating platform 1 by suction adhesion or locking, the lifting/lowering cylinder 26a operates to lower the nozzle main body 51: to insert the solution injection nozzle 10 into the solution injection hole 101; and to press the pressure reducing pad 11 against the portion surrounding the solution injection hole 101 at the same time.

After the pressing is completed, when a pressure reducing device which is not shown is activated, air within the outer can 100 is sucked through the pressure reducing pad 11 and the pressure in the outer can 100 is gradually reduced. Simultaneously with or after this pressure reduction, a solution injection device which is not shown is activated to supply the electrolyte L into the outer can 100. Then, after suction adhesion of the suction adhesion pad 36 is completed, a rotation device such as a motor which is not shown is activated to activate the timing belt 34. Thus, since the pressure reducing pad 11 adheres to the outer can 100 by suction, the pressure reducing pad 11 and the rotating portion 55 rotate together with the outer can 100. Thereafter, similarly to the first embodiment, dense filling of the electrolyte L, is conducted by rotation of the outer can 100 about the solution injection nozzle 10. Then, after or immediately before reaching the final stage, the solution injection is completed. Simultaneously with or after the completion of the solution injection, the reduced pressure is released, and the lifting/lowering cylinder 26a finally operates in a reverse manner to pull the nozzle main body 51 upward. Thereafter, the suction adhesion or locking of the rotating platform 1 is released, and the outer can 100 in which the electrolyte L has been filled is sent out from the rotating platform 1.

The present invention is not limited to the above-described embodiments, and various modification can be made without departing from the scope of the present invention.

DESCRIPTION OF THE REFERENCE CHARACTERS 1 rotating platform
2 disk base
3 arm
3a mounting hole
5 solution injection device
10 solution injection nozzle
10c slide hole
11 pressure reducing pad
20 lifting/lowering device
21 guide block
22 lifting/lowering shaft
23 lower end bar
24 lifting/lowering drive projection
24a large-diameter portion
25 lifting/lowering drive groove
26 lifting/lowering device driving portion
26a lifting/lowering cylinder
26b lifting/lowering guide
26c guide plate
27 lifting/lowering block
27a lifting/lowering drive hook
28 upper end bar
28a support portion
28b compression coil spring
29 rotating shaft
30 rotary drive device
31 rotation mechanism portion
31a inner ring
31b outer ring
31c steel ball
33 driven pulley
34 timing belt
35 suction adhesion rotator
35a rotator mounting portion
35b guide member
35c slide shaft
35d spring
35e stopper
35f suction adhesion block
35g suction adhesion hole
36 suction adhesion pad
37 suction adhesion pipe
40 nozzle insertion/detachment mechanism
41 connection communication pipe
51 nozzle main body
51a insertion mounting portion
51b flange
51c mounting ring
51d nozzle insertion hole
51e small-diameter portion
51f first suction hole
51g nozzle guide
51h guide hole
51i outer flange
51m sheath pipe
51n nozzle pipe
52 pressure reducing member
53 fixed portion
53a third suction hole
16
54 locking screw
54a packing
54b packing
55 rotating portion
55a second suction hole
56 solution injection pipe
57 bearing
100 outer can
101 electrolyte solution injection hole
110 electrode assembly
A apparatus main body
L electrolyte

The invention claimed is:
1. An injection method for injecting an electrolyte, the injection method comprising:
hermetically sealing a solution injection hole of an outer can in which an electrode assembly is stored, by a rotatable pressure reducing pad provided so as to surround a periphery of a solution injection nozzle;

inserting the solution injection nozzle into the solution hole after reduction of a pressure in the outer can through the rotatable pressure reducing pad, supplying the electrolyte from the solution injection nozzle into the outer can while making an inside of the outer can into a negative pressure through the rotatable pressure reducing pad; and rotating the outer can and the rotatable pressure reducing pad adhered by suction to a portion of the outer can surrounding the solution injection hole with the solution injection nozzle as a rotation center.

2. The injection method according to claim 1, wherein the pressure reduction is continuously conducted during solution injection from the solution injection nozzle.

3. An electrolyte injection apparatus comprising:

a rotating platform configured to retain an outer can in which an electrode assembly is stored and to rotate with a solution injection hole of the outer can as a rotation center;

a solution injection device including a solution injection nozzle which is provided so as to coincide with the rotation center of the rotating platform and is configured to supply an electrolyte into the outer can when being inserted into the solution injection hole of the outer can, and a rotatable pressure reducing pad which is provided so as to surround a periphery of the solution injection nozzle and is configured to adhere by suction to a portion of the outer can surrounding the solution injection hole and to make an inside of the outer can into a pressure-reduced state at a time of solution injection;

a lifting/lowering device configured to cause the rotating platform and the solution injection device to be relatively close to each other or separated from each other and to press the rotatable pressure reducing pad against the portion of the outer can surrounding the solution injection hole to hermetically seal the solution injection hole when the rotating platform and the solution injection device are caused to be close to each other; and a rotary drive device configured to rotate the outer can and the rotatable pressure reducing pad adhered by suction to the portion of the outer can surrounding the solution injection hole.

4. The electrolyte injection apparatus according to claim 3, further comprising a nozzle insertion/detachment mechanism configured to bring the rotatable pressure reducing pad into contact with the portion of the outer can surrounding the solution injection hole to retain the solution injection nozzle outside the solution injection hole during a period from start of reduction of a pressure in the outer can to a time of the pressure being reduced to a predetermined pressure, and to insert the solution injection nozzle into the solution injection hole after reaching the predetermined pressure.

* * * * *